US008196635B2

(12) United States Patent
Lenhardt

(10) Patent No.: US 8,196,635 B2
(45) Date of Patent: Jun. 12, 2012

(54) DEVICE FOR ASSEMBLING INSULATING GLASS PANES THAT ARE FILLED WITH A GAS WHICH IS DIFFERENT FROM AIR

(75) Inventor: Karl Lenhardt, Bad Liebenzell (DE)

(73) Assignee: Plus Inventia AG, St. Gallen (CH)

( * ) Notice: Subject to any disclaimer, the term of this patent is extended or adjusted under 35 U.S.C. 154(b) by 199 days.

(21) Appl. No.: 12/226,460

(22) PCT Filed: Apr. 13, 2007

(86) PCT No.: PCT/EP2007/003279
§ 371 (c)(1),
(2), (4) Date: Sep. 10, 2009

(87) PCT Pub. No.: WO2007/121872
PCT Pub. Date: Nov. 1, 2007

(65) Prior Publication Data

US 2010/0032103 A1 Feb. 11, 2010

(30) Foreign Application Priority Data

Apr. 19, 2006 (DE) ........................ 10 2006 018 333

(51) Int. Cl.

| | |
|---|---|
| ***B29C 65/56*** | (2006.01) |
| ***B29C 65/78*** | (2006.01) |
| ***B32B 37/10*** | (2006.01) |
| ***B32B 37/12*** | (2006.01) |
| ***B32B 37/24*** | (2006.01) |
| *B29C 65/02* | (2006.01) |
| *B32B 37/02* | (2006.01) |

(52) U.S. Cl. ......... 156/578; 156/381; 156/497; 156/575

(58) Field of Classification Search .................. 156/381, 156/497, 538, 575, 578
See application file for complete search history.

(56) References Cited

U.S. PATENT DOCUMENTS 4,780,164 A * 10/1988 Rueckheim et al. .......... 156/104
5,332,080 A * 7/1994 Lenhardt ...................... 198/497
5,350,469 A * 9/1994 Lenhardt et al. ............. 156/102
5,366,574 A * 11/1994 Lenhardt ...................... 156/102
5,676,782 A 10/1997 Lisec
6,216,751 B1 * 4/2001 Trpkovski ........................ 141/7
(Continued)

FOREIGN PATENT DOCUMENTS

CA 02557119 A1 * 9/2005
(Continued)

OTHER PUBLICATIONS

English translation of EP 0674087, Lisec. Oct. 14, 2007.*

(Continued)

*Primary Examiner* — Sonya Mazumdar

(57) ABSTRACT

According to the invention, a suspended blade (55) is provided as a seal which is active between the plates (1*a*, 2*a*), said blade comprising a suspension (52) which can be displaced along the upper edge of the first of the two plates (1*a*), the distance of the suspension from each plane being changeable. The front side of the first plate (1*a*) lies in said suspension and the blade (55) is provided, at least on one side, with a reversible yielding sealing compound.

26 Claims, 14 Drawing Sheets

U.S. PATENT DOCUMENTS

| | | | | |
|---|---|---|---|---|
| 7,785,432 | B2 * | 8/2010 | Lenhardt | 156/109 |
| 7,922,842 | B2 * | 4/2011 | Vianello | 156/64 |
| 2007/0175564 | A1 | 8/2007 | Lenhardt | |

FOREIGN PATENT DOCUMENTS

| | | | | |
|---|---|---|---|---|
| WO | WO 2005080739 | A1 * | 9/2005 | |
| WO | WO 2007/009642 | A2 | 1/2007 | |

OTHER PUBLICATIONS

Translation of Search Report for PCT/EP2007/003279.*

English translation of WO 2005080739A1—Sep. 1, 2005—Lenhardt, Karl.*

Family Listing of WO 2005080739A1—Sep. 1, 2005—Lenhardt, Karl.*

* cited by examiner

DEVICE FOR ASSEMBLING INSULATING GLASS PANES THAT ARE FILLED WITH A GAS WHICH IS DIFFERENT FROM AIR

The present invention relates to a device having the features defined in the preamble of Claim 1. A device of that kind is also known as gas-filling press and has been known from WO 2005/080739 A1. The known device comprises two plates, which are variable with respect to their spacing, that can be transferred from an initial position, in which they are arranged in V form one relative to the other, to a position parallel one to the other and can be moved closer one to the other. A horizontal conveyor, using a belt as a conveyor element, is arranged near the lower edge of the plates. In the initial position in V form of the plates pairs of glass panels, one of which is already provided with a spacer bonded to it, can be simultaneously transported, in V arrangement and one positioned opposite the other, into the space between two plates and can be placed in registration and opposite one to the other. Thereafter, one of the plates is brought into a position parallel to the other plate and is approached to the latter until a small gap of 2 mm, for example, is left between the one glass panel and the opposite spacer. The means intended to retain the glass panels in contact with the movable plate consist in small openings in the plate through which air can be drawn in by a blower arranged behind the plate whereby the glass panels will be attached to the plate. The pivoting movement, which the movable plate performs to get into parallel alignment, causes the glass panels attached to the plate to be lifted off the belt of the horizontal conveyor. The gap thereby formed permits a gas different from air, especially a heavy gas, to be introduced into the space between the two glass panels.

In order to prevent the heavy gas from filing the entire space between the plates, and to restrict the gas, if possible, to the space occupied by the pairs of glass panels, there are provided a plurality of seals that extend from the upper run of the belt to the upper edge of the plates. One of such seals is arranged on the end of the plates and takes especially the form of a shutter pivotally mounted on the edge of the one plate to pivot against the edge of the other plate. The other seals are designed as partition walls that can be moved out of one of the plates and against the opposite plate so as to close off a compartment of the space between the plates. The partition wall operated at any time is the one that delimits the smallest possible space with regard to the pairs of glass panels located between the plates. The partition walls being arranged in fixed positions, the delimitation of the space to be filled with heavy gas is not the best possible. As a result, quite considerable losses of heavy gas are encountered. Although such gas losses might be reduced by the installation of additional partition walls, such a solution would be expensive under constructional aspects.

SUMMARY OF THE INVENTION

Now, it is the object of the present invention to show how the consumption of gas can be reduced in a device of the described kind.

This object is achieved by a device for assembling insulating glass panes filled with a gas which is different from air, having two plates which can be varied with respect to their spacing one from the other and which can be approached one to the other from a position in which they are oriented in V form one to the other to a parallel position in which they are inclined toward the horizontal, having a horizontal conveyor arranged near the lower edge of the plates, with a belt serving as a conveying member, having at least two seals that extend from the upper run of the belt to a point above the belt and that are spaced one from the other in the conveying direction of the belt, at least one of the seals being active between the two plates, and having means for retaining a glass panel against at least one of the plates, and having means for introducing a gas different from air into the space between the two plates from below. In said device the seal that is active between the plates is designed as a suspended blade which comprises a suspension that can be displaced along the upper edge of a first one of the two plates and is variable with respect to its spacing from the plane that includes the front of the first plate, and the blade is provided with a reversibly yielding sealing material at least on one side. Advantageous further developments of the invention are the subject-matter of the sub-claims.

According to the invention, the gas-filling press is no longer partitioned by different partition walls arranged in predefined positions. Instead, a seal is provided between the plates of the gas-filling press, which is designed as a suspended blade provided, at least on one side, with a reversibly yielding sealing material that extends down to the belt of the horizontal conveyor, and which comprises a suspension which can be displaced along the upper edge of the first one of the two plates, is variable with respect to its spacing from the plane that includes the front of the first plate, and which faces the second plate. This provides considerable advantages:

- The blade can be positioned closely behind the last pair of glass panels so that the length of the space between the blade and the stationary seal provided at the end of the plates of the gas-filling press can be minimized continuously, not only by discrete steps.
- The blade may be, or may be placed, in its ideal position already while the pairs of glass panels are still being fed into and positioned in the gas-filling press.
- This permits short cycle times of the gas-filling press to be achieved.
- By making the suspension of the blade variable with respect to its spacing from the front of the first plate it can be positioned in lengthwise arrangement at a spacing from the plates.
- By allowing the spacing of the suspension of the blade from the first plate to be variable, the blade can be brought into contact with the first stationary plate already forward of the movable plate. This protects the blade, the sealing material on the blade and the plate surfaces.
- By allowing the spacing of the suspension from the stationary first plate to be varied, it is possible to position the seal, in the initial arrangement of the plates in V form, in such a way that even glass panel arrangements for very thick insulating glass panes and for multiple insulating panes can be transported past the blade without any obstruction, and this especially also because the blade can be positioned between the plates asymmetrically.
- Because of the reversibly compressible sealing material provided on the blade it is possible for the seal to adapt itself automatically to the thickness of the insulating glass panes to be produced.

Useful sealing can be achieved by the blade already when the latter is provided with a sealing material on one side only. The other side of the blade may be smooth and flat, to attach itself flat against the one plate, and is subjected to a pressure sufficient to produce a useful sealing effect through the pressure exerted on the sealing material by the other plate. Preferably, however, both sides of the blade are provided with a sealing material which preferably consists of a reversibly compressible expanded plastic material.

The sealing material conveniently extends over the full length of the blade, preferably even a certain length beyond the lower end of the blade, to permit effective sealing relative to the surface of the belt of the horizontal conveyor to be achieved due to the compressibility of the sealing material.

Especially well suited as material for the blade is a sheet steel, especially one having poor spring characteristics, to keep undesirable bending of the blade within small limits. The blade may be coated with equally thick layers of the sealing material on both sides. Preferably, it is coated with a thicker layer on one side than on the other side, preferably so that the side of the blade by which it attaches itself to the plate of the gas-filling press by displacement of its suspension—that plate preferably being the stationary plate of the gas-filling press—is provided with a thinner layer, compared with the other side. The blade thereby assumes an especially well defined position relative to the nearest plate, whereas the other plate, which is approached to the first-mentioned plate for closing of the gas-filling press, is compressed to the measure defined by the thickness of the insulating glass pane to be produced.

Now, with respect to the structure of the device, it is the most favorable solution to mount the blade, together with its suspension, on a stationary plate. This embodiment is therefore preferred.

The blade may have a uniform width from the top to the bottom. Preferably, however, the width of the blade increases from the bottom to the top, especially in wedge shape, the wedge angle conforming to the angle defined by the two plates of the gas-filling press in their initial position in V form. This provides the advantage that the blade gets stiffer from the bottom to the top. Any deflection of the blade caused by movements occurring when the blade is positioned in the conveying direction can be kept small in this way. When the blade is moved in the conveying direction, it preferably is at first given an orientation transverse to the conveying direction for this purpose. In that orientation, swinging in a plane transverse to the conveying direction can be almost excluded, whereas swinging in the conveying direction can be restricted to within very close limits due to the fact that the blade gets wider from the bottom to the top. Given the fact that the two plates of the gas-filling press are likewise arranged in V form in their initial position, the wedge-like increase in width of the blade does not result in its spacing from the two plates of the gas-filling press getting smaller; rather, the spacing may remain unchanged from the top to the bottom so that both small and large glass panels can be conveyed through the gap between the edges of the blade and the two plates of the gas-filling press without any impediment.

Conveniently, the suspension of the blade is adjustable in height. This permits the blade to be moved in the conveying direction at a spacing from the belt so that it will not slide on the belt. Once the blade has arrived in its position in which sealing is intended to occur, the blade can be lowered unto the belt of the horizontal conveyor so that sealing can be achieved also in relation to the belt. Displacing the belt to the top and to the bottom may be effected using a pneumatic cylinder or using a driven spindle. An especially simple solution is obtained when that movement is combined with the movement used for varying the spacing of the suspension from the plate on which the blade is mounted. This can be achieved with advantage when the suspension is made displaceable in a plane that intersects the conveying direction at a right angle, in a direction that is inclined relative to the upside of the belt of the horizontal conveyor, and this exactly to a degree that will cause lowering of the belt as it approaches its plate—the first plate.

It has already been pointed out that it is an advantage if the blade can be pivoted about an axis that extends from the top to the bottom so that it will occupy a position transverse to the conveying direction when being displaced in the conveying direction, and a position parallel to the plates during the sealing action. Preferably, the blade can be pivoted about its center axis, especially by a swinging movement about an angle of 90°. Preferably, the axis can be blocked in a given position. Blocking is convenient when the blade is positioned in the conveying direction; it is, however, unnecessary when the blade is brought into contact with the one plate of the gas-filling press because in that case the plate already prevents undesirable turning of the blade.

In addition, the blade preferably is suspended to swing about a horizontal axis that extends in parallel to the conveying direction. Such a swinging suspension is convenient in order to ensure that the blade, being approached to its plate, can easily adapt itself to the plate progressively from the bottom to the top, without having to bend. However, swinging is undesirable when the blade is being displaced in the conveying direction. This is the reason why the horizontal axis, about which the blade is permitted to swing, preferably can be blocked.

At least one of the two plates in the gas-filling press is adjustable relative to the belt of the horizontal conveyor so as to permit the spacing of the lower edge of the plate to be increased. This can be achieved with advantage when the plate is pivoted from its position, in which an acute angle is enclosed between the plate and the other plate, into a parallel position, as the lower edge of the plate then performs an arcuate movement. In order to ensure that the glass panel, which rests against the plate to be pivoted, will be retained on the plate the latter requires suitable means for holding the glass panel. Preferably, the glass panel will be attached to the plate by suction. For this purpose, the plate is provided with holes, for example, through which air can be drawn in to attach the glass panel. The arcuate movement of the lower edge of the plate creates a gap through which a gas different from air can be introduced into the space between the two plates and, thus, into the space between the glass panels attached to the plates. Means for introducing a gas different from air are therefore preferably associated to the lower edge of the movable plate of the gas-filling press. Such means may for example consist of a nozzle extending over the length of the lower edge of the plate.

Preferably, the means for introducing the gas different from air comprise a channel associated to the lower edge of the movable plate on which a glass panel is held at a distance from the belt. That channel should extend in parallel to the conveying direction and may comprise branch ducts that open into a gap between the belt and the lower edge of the glass panel that is retained on the plate.

The gas different from air, especially a heavy gas, is required only in those areas where pairs of glass panels are positioned between the two plates of the gas-filling press. That space is delimited by the two seals that extend from the bottom to the top, namely by the blade and the seal on the one vertical edge of the plates of the gas-filling press. Preferably, a sealing body that can be displaced in lengthwise direction is therefore provided in the channel for varying the effective length of the channel. Preferably, that sealing body is arranged for being displaced in synchronism with the blade so that it will always occupy the same position as the blade, relative to the conveying direction.

In order to achieve effective sealing of the channel in lengthwise direction, the sealing body conveniently is given a length greater than the spacing between two branch ducts so that at least one branch duct will be covered and blocked by the sealing body in any position of the sealing body. In order to ensure that the gas will be introduced uniformly over the length of the insulating glass panes to be filled and will be permitted to rise in the space between the two seals that extend from the bottom to the top, the gas different from air can be introduced into the channel through a plurality of supply lines that can be shut off individually.

BRIEF DESCRIPTION OF THE DRAWINGS

Certain embodiments of the invention are illustrated in the attached drawings. Identical or corresponding parts are identified by identical reference numerals in the different examples.

DETAILED DESCRIPTION

Figure 1:
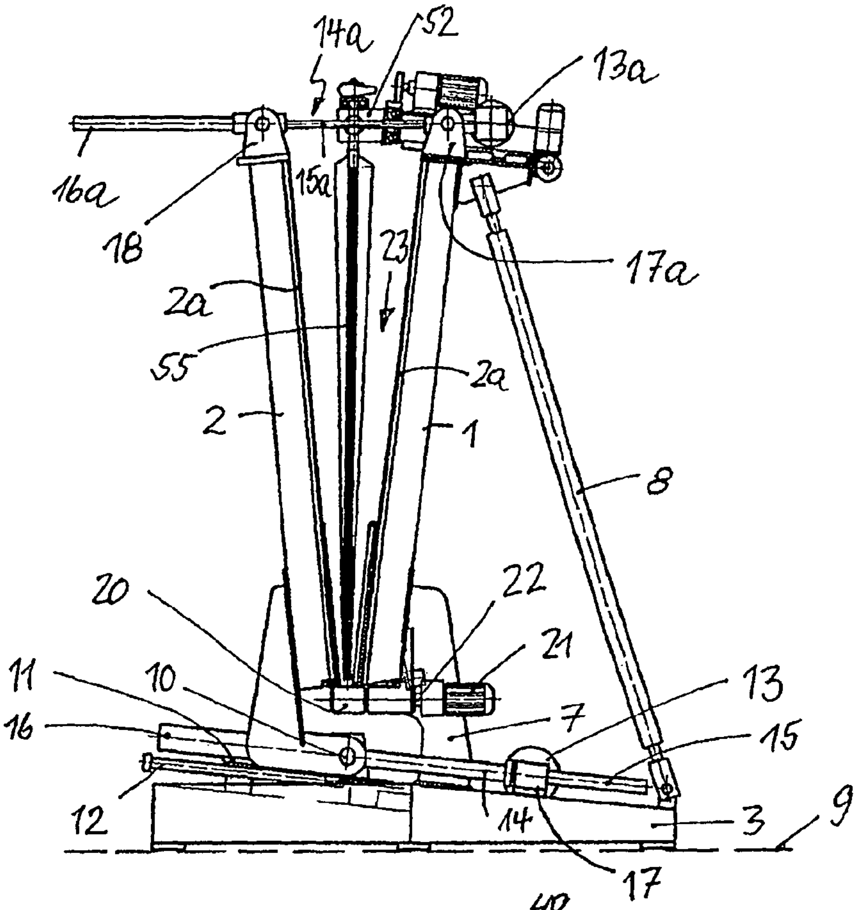
FIG. 1 shows an elevation of a device for assembling, filling with gas and for pressing insulating glass panes, viewed in the conveying direction, with the device in its open position in which two pressure plates arranged in V form one relative to the other are spaced a greater distance one from the other, and a sealing arrangement is suspended between the plates.

The device for assembling, filling with gas and pressing insulating glass panes illustrated in FIGS. 1 to 10, hereinafter shortly referred to as "gas-filling press", comprises two supporting devices 1 and 2 arranged one opposite the other on a frame 3. Each of the two supporting devices 1 and 2 comprises plates 1*a* and 2*a* which are provided with passage holes at many points distributed over the plates, which passage holes are connected with a blower—not shown—by which air selectively can be blown to form an air cushion between the plates 1*a*, 2*a* and a glass panel 24, 25 leaning against that plate, or can be removed by suction.

The first supporting device 1 stands on a base 7 which is firmly connected with the frame 3; the rear of its upper end is supported on the frame 3 via struts 8. The arrangement is such that the plate 1*a* is inclined to the rear, relative to the vertical line, by an angle of 6°, for example. The horizontal floor on which the frame 3 is located is indicated by reference numeral 9.

The second supporting device 2 is mounted on a carriage 11 for pivotal movement about an axis 10 that extends perpendicularly to the drawing plane in FIG. 1, the carriage being arranged for linear displacement along rails 12, which extend in vertical planes relative to the pivot axis 10, and which are inclined relative to the horizontal line 9 by the same angle by which the plate 1*a* is inclined relative to the vertical line. Accordingly, the carriage 11 can be displaced in a direction perpendicular to the plate 1*a*. Displacement of the carriage 11 is brought about by a motor 13 that drives a spindle 15 of a spindle gearing 14 whose spindle nut is located in a housing 16 and is connected with the carriage 11 for pivotal movement about a horizontal axis extending in parallel to the conveying direction 4 (see FIG. 16). The spindle 15 is likewise seated in a holder 17 mounted on the frame 3, with its axis extending in parallel to the conveying direction 4.

The upper ends of the supporting devices 1 and 2 are connected one with the other by a further spindle gearing 14*a* whose spindle 15*a* is pivotally seated in a holder 17*a* mounted on the first supporting device 1 and is driven by a motor 13*a*. The associated spindle nut is accommodated in a housing 16*a* and is seated for pivotal movement in a holder 18 mounted on the movable supporting device 2. The spindle gearings 14 and 14*a* are provided in duplicate, preferably in the neighborhood of the four corners of the rectangular contour of the plates 1 and 2*a*.

Figure 5:
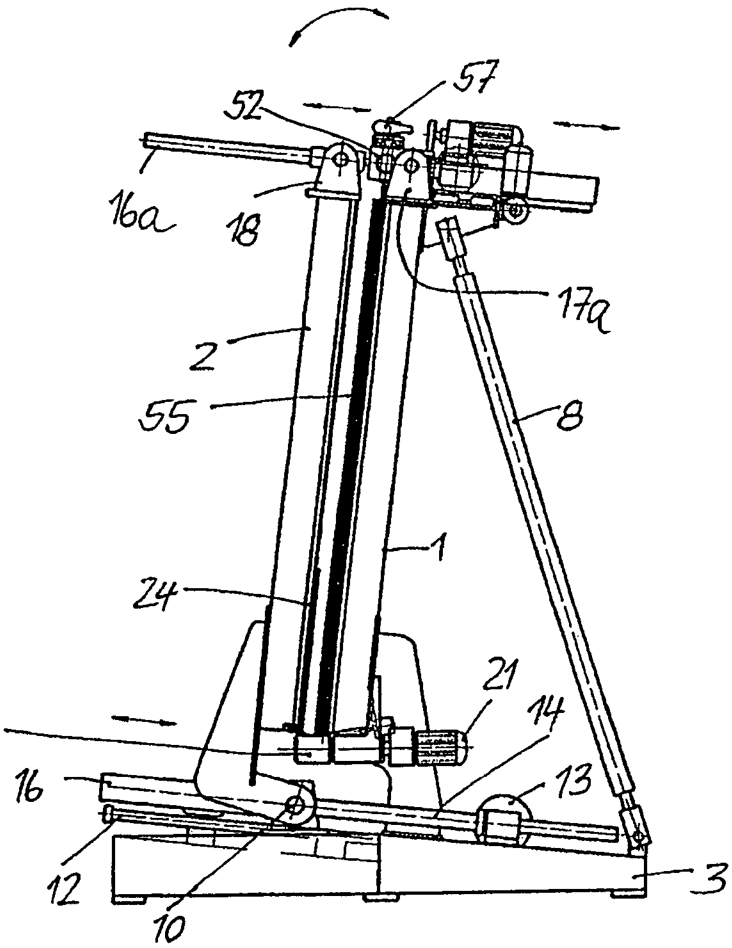
FIG. 5 shows a view similar to FIG. 3 of the same device, but with the plates transferred to a parallel position and the sealing device applied to one of the two plates.
Figure 6:
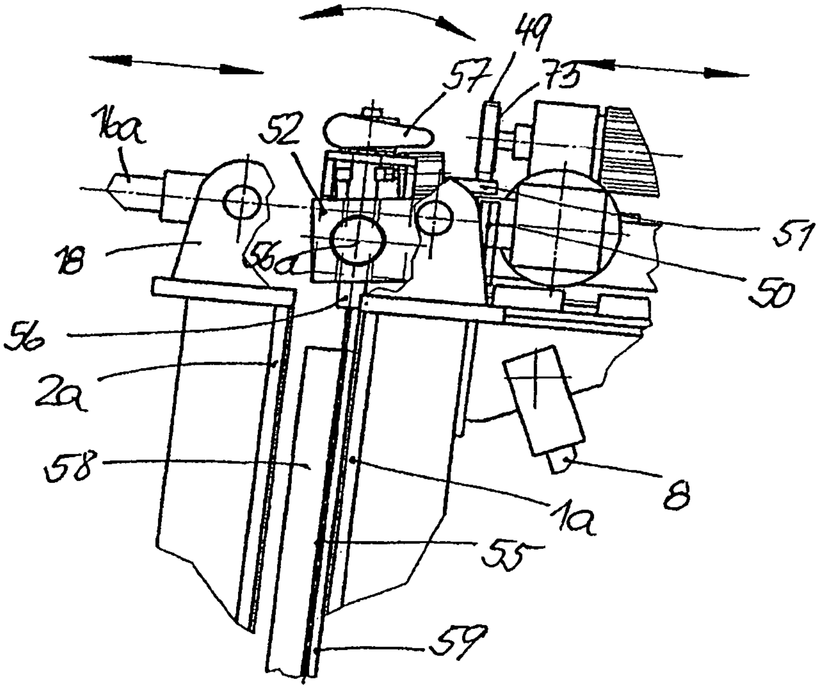
FIG. 6 shows an enlarged view of a detail from FIG. 5.
Figure 7:
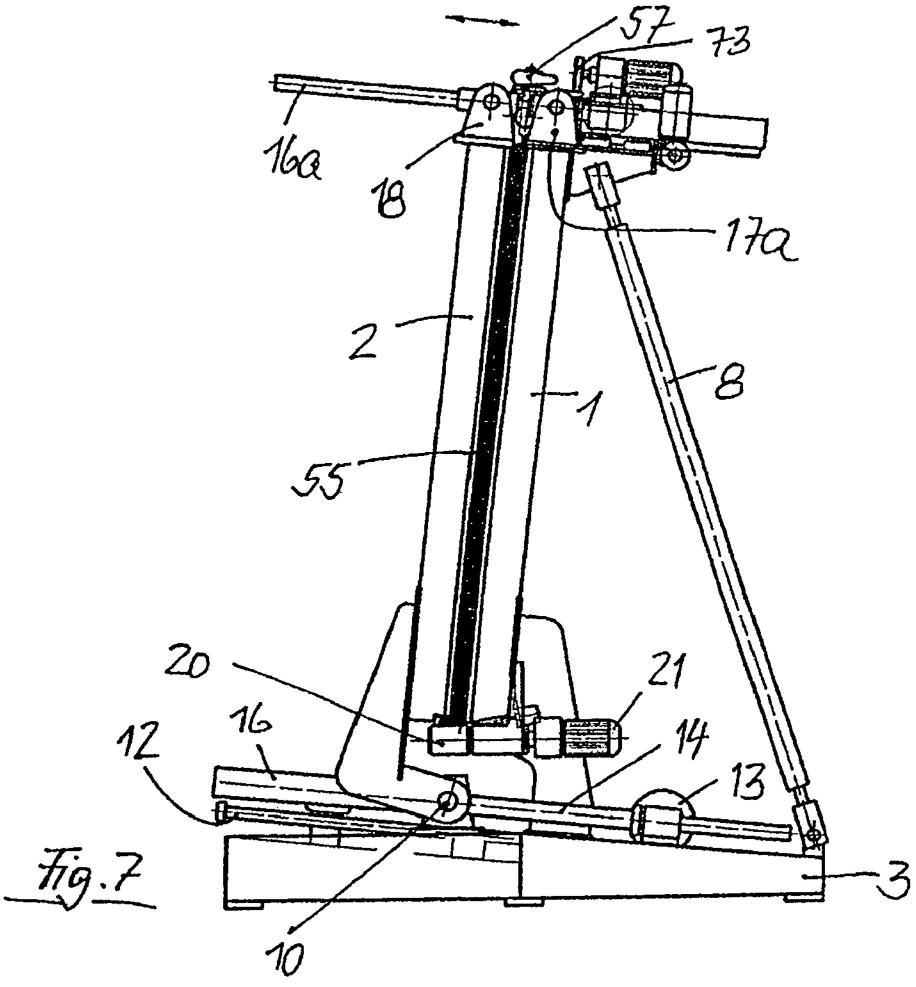
FIG. 7 shows a view similar to FIG. 5 of the same device, but with the two plates approached one to the other so closely that the sealing device is in contact with both plates.
Figure 8:
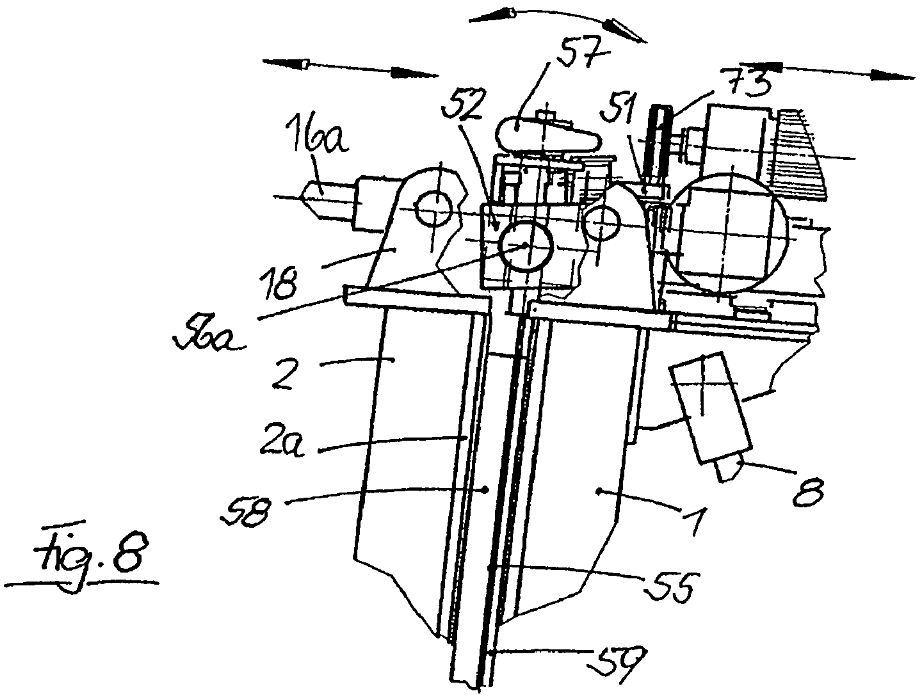
FIG. 8 shows an enlarged view of a detail from FIG. 7.

By driving the spindles 14*a*, the second supporting device 12 can be pivoted from its initial position illustrated in FIG. 1, in which the plates 1*a* and 2*a* are arranged one opposite the other in V form at an angle of 12°, for example, into the intermediate position illustrated in FIG. 5 in which the movable plate 2*a* is arranged opposite and in parallel to the plate 1*a*, preferably at a spacing of 5 cm to 7 cm. From the intermediate position illustrated in FIG. 5, the movable supporting device 2 can then be further approached to the stationary supporting device 1, by synchronous activation of the lower and the upper spindles 15 and 15*a*—see FIG. 7—, during which operation the parallel arrangement of the two elements remains unchanged.

A horizontal conveyor 20 mounted on the lower edge of the stationary supporting device 1 can be driven by a motor 21. The horizontal conveyor 20 is a track of a horizontal conveyor, composed from a plurality of tracks, that extends through the entire insulating glass pane production line in which the invention is to be implemented. The horizontal conveyor 20 comprises a belt 19, especially a toothed belt, that can be driven by the motor 21 via a driving wheel, especially a gear. In order to prevent sagging, the belt 19 is supported on a series of free-wheeling rollers or on a horizontal rail 6 on which the upper run of the belt 19 is permitted to slide.

Pairs of glass panels 24 and 25, placed in V form, are simultaneously conveyed into the gas-filling press using a feeder. The feeder may consist of a horizontal conveyor aligned with the horizontal conveyor 20 and of two supporting devices the fronts of which are aligned with the plates 1*a* and 2*a*. The supporting devices may consist of air-cushion walls, similar to the plates 1*a* and 2*a* in the gas-filling press. However, the supporting devices may comprise free-wheeling rollers that are seated in a frame and whose bearing surfaces have a common tangential plane. Suitable feeders have been described in DE 10 2004 009 860 A1.

The pressure plates 1*a* and 2*a* in the gas-filling press are provided with holes through which air selectively can be blown to produce an air cushion on which the glass panels can slide while being transported, or can be drawn in for attaching the glass panels to the plates. These openings are not shown in the Figures for reasons of clarity.

The sides of the pressure plates 1*a* and 2*a* that face each other are provided with a layer 43 of rubber or another elastomeric material. That layer may have a thickness of 3 mm to 4 mm, for example.

A hose 41, which can be selectively evacuated or blown up, is arranged in a longitudinal groove in the pressure plate 2*a*, that groove being provided at the lower edge of the pressure plate 2*a* and being open toward the bottom. The hose is evacuated in the illustration of FIG. 9 and is blown up in the illustration of FIG. 10.

Figure 20:
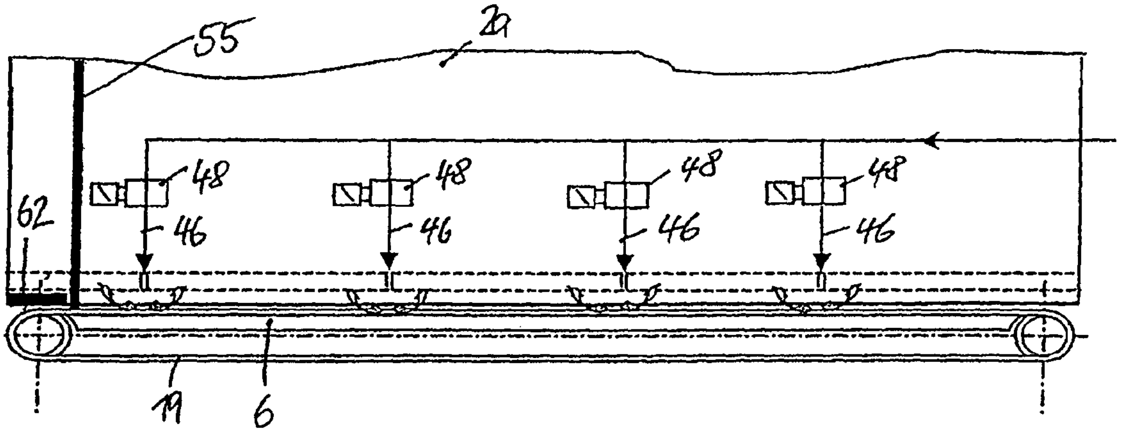
FIG. 20 shows a representation similar to that of FIG. 18 illustrating the way how the heavy gas is introduced into the press when the suspended sealing device occupies the position illustrated in FIG. 19.

The gap between the glass panel 25 and the oppositely arranged pressure plate 2*a*, or between the two pressure plates 1*a* and 2*a*, is closed off by the belt 19 of the horizontal conveyor 20. A sealing wedge 26, being shown in its inactive position in FIG. 9 and in FIG. 10 in its active position in which it has been advanced from its inactive position, can be introduced into the gap between the stationary pressure plate 1*a* and the belt 19, over the full length of the stationary pressure plate 1*a*. Sealing between the oppositely arranged movable pressure plate 2*a* and the belt 19 is effected by the hose 41, which is shown in its inactive position in FIG. 9 and in its active position in FIG. 10. The hose 41 extends over the full length of the pressure plate 2*a*. A channel 44, which can be supplied with a gas different from air, especially a heavy gas, via supply lines 46 shown by broken lines in FIGS. 9 and 10, extends in parallel to the hose 41 between the hose 41 and the front of the movable pressure plate 2*a* with the rubber layer 43. That channel 44 is represented in the horizontal section of FIG. 16 and in the section of FIGS. 18 and 20, taken in parallel to the pressure plate 2*a*. The supply lines 46, which are distributed over the length of the movable pressure plate 2*a* at regular spacings, can be shut off individually via electromagnetic valves 48. In the position of the movable pressure plate 2*a* illustrated in FIG. 10, a heavy gas introduced into the channel 44 via the supply lines 46 is permitted to flow through a gap formed between the belt 19 and the lower edge of the glass panel 24 into the space between the glass panels 24 and 25, to rise in that space and to displace the air toward the top.

Figure 17:
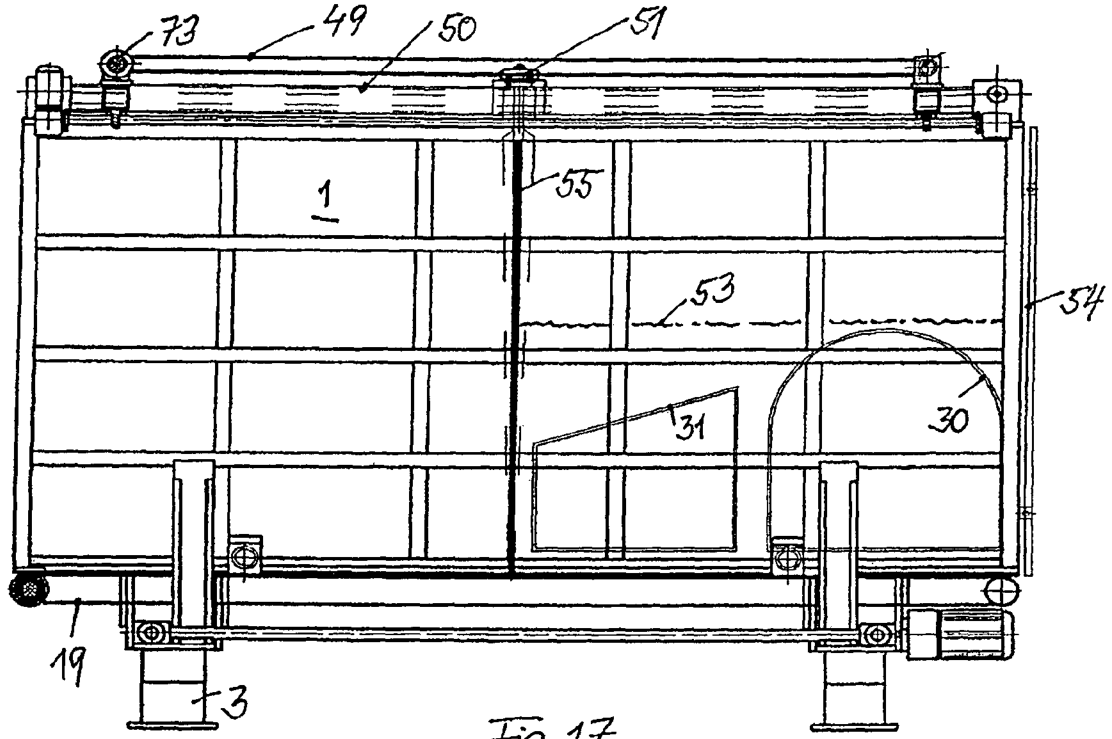
FIG. 17 shows a front view of the device, valid for all the three embodiments of the device, that illustrates where the suspended sealing device might be positioned when two insulating glass panes, occupying for example less than half the length of the device, are to be filled with a heavy gas.
Figure 19:
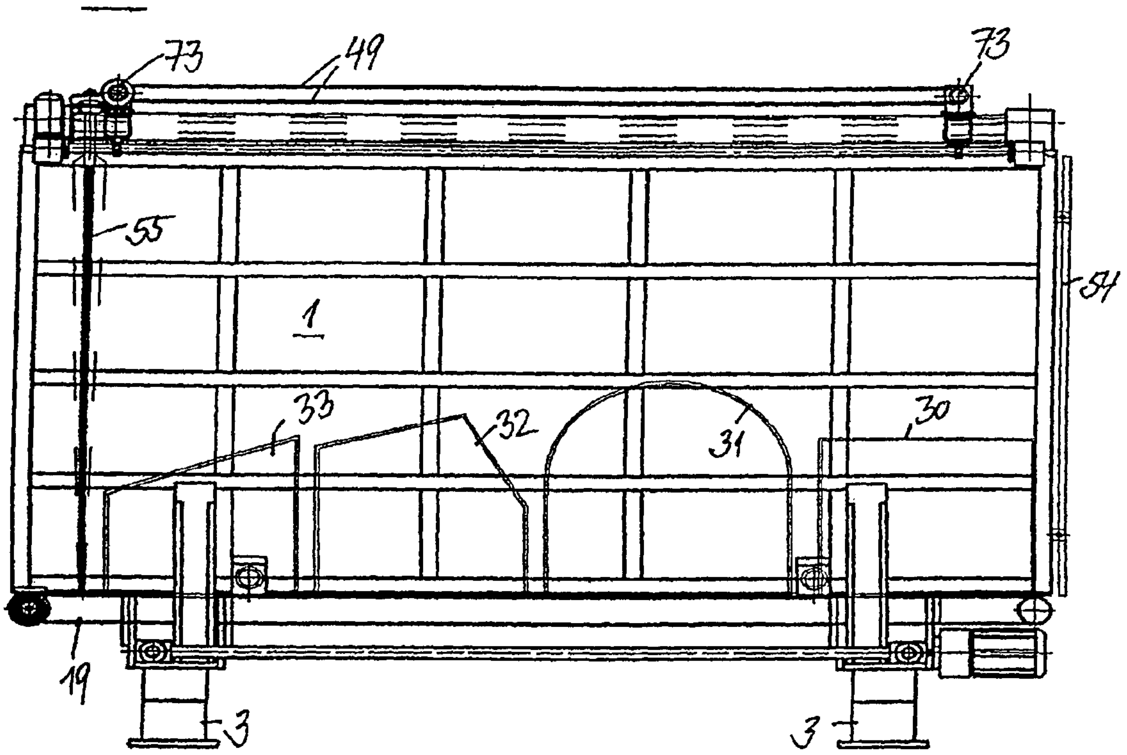
FIG. 19 shows a representation similar to that of FIG. 17 illustrating the position of the suspended sealing device in case four insulating glass panes, for example, are simultaneously filled with a heavy gas in the device and the four insulating glass panes occupy nearly the full length of the device.

The channel 44 and the gap 23 between the two pressure plates 1*a* and 2*a* can be sealed in the conveying direction 4 by a sealing strip 54—see FIGS. 17 and 19—which extends from the belt 19 to the upper edge of the pressure plates 1*a* and 2*a* and which can be applied to the approximately vertical edges of the pressure plates 1*a* and 2*a*. The sealing strip 54 may be linked to the stationary pressure plate 1*a* by a four-bar linkage, for example, and may be pivoted into contact with the two approximately vertical edges of the pressure plates 1*a* and 1*b* and pivoted back from that position into an inactive position in which assembled insulating glass panes can be transported out of the gas-filling press without any obstruction and new pairs of glass panels can be fed in simultaneously.

The following means are intended to prevent gas from escaping from the gas-filling press in a direction opposite to the conveying direction 4:

A slide 51 can be displaced along a guide rail 50 which extends in parallel to the conveying direction 4 and which is mounted on the upper edge of the stationary pressure plate 1*a*. The slide 51 is drawn by an endless belt 49 that runs about two guide rollers 73 one of which is driven. Mounted on the slide 51 is a suspension 52 that is located above the gap between the two pressure plates 1*a* and 2*a*. A blade 55, suspended on the suspension 52, can be pivoted about an axis 56, that extends from the top to the bottom, and about an axis 56*a* parallel to the conveying direction 4. Pivoting about the axis 56 is effected by a rotary drive 57, preferably a pneumatic rotary drive, for example a rotary cylinder, by which the blade 55 can be pivoted by 90° from its position shown in FIG. 2, in which it extends in a plane oriented at a right angle to the pressure plates 1*a* and 1*b*, into the position illustrated in FIG. 4 in which the blade extends in a plane that includes the conveying direction 4. The blade 55 preferably consists of a sheet steel material having the least possible flexibility and is lined on its two surfaces with a reversibly compressible expanded plastic material, i.e. with a somewhat thicker layer 48 on the side facing the movable pressure plate 2*a* in FIG. 4 and with a relatively thinner layer 59 of the expanded plastic material on the surface facing the stationary pressure plate 1*a*. The blade 55 tapers like a wedge from the top to the bottom. At its lower end, the blade is so narrow that the glass panels 24 and 25, and the spacer 27 attached to the one glass panel 25, can be conveyed without any obstruction past the blade 55 that hangs down transversely in the gap 23—see FIG. 1 and FIG. 2.

Figure 2:
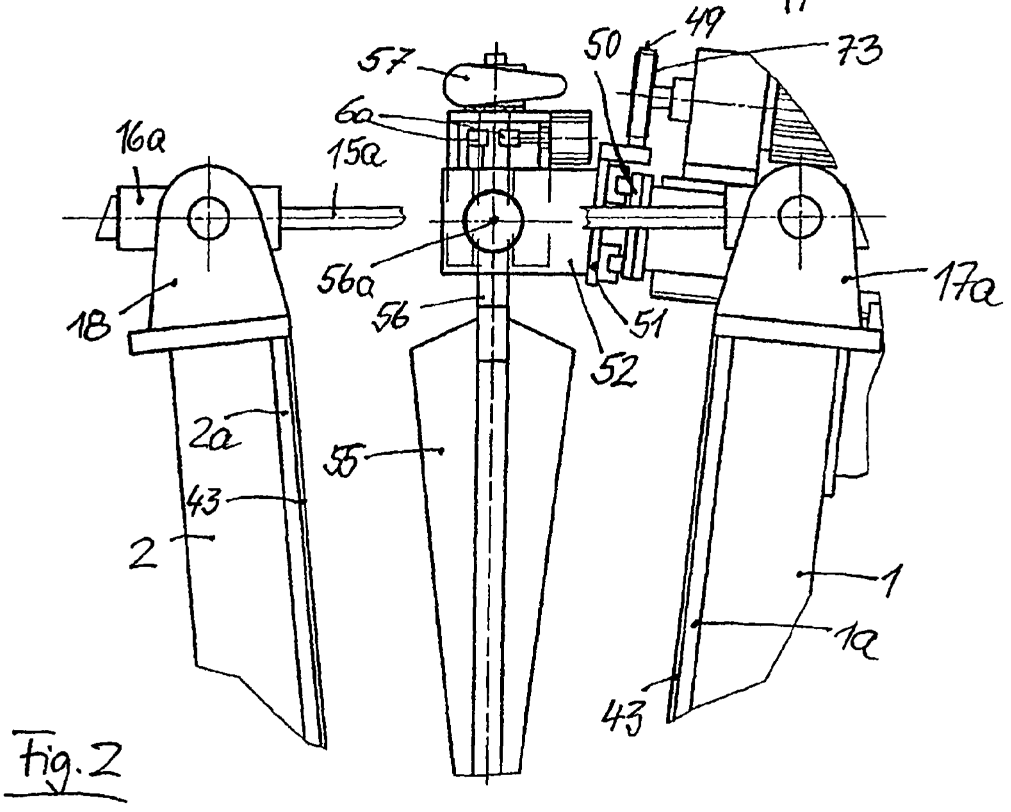
FIG. 2 shows an enlarged view of a detail from FIG. 1.
Figure 3:
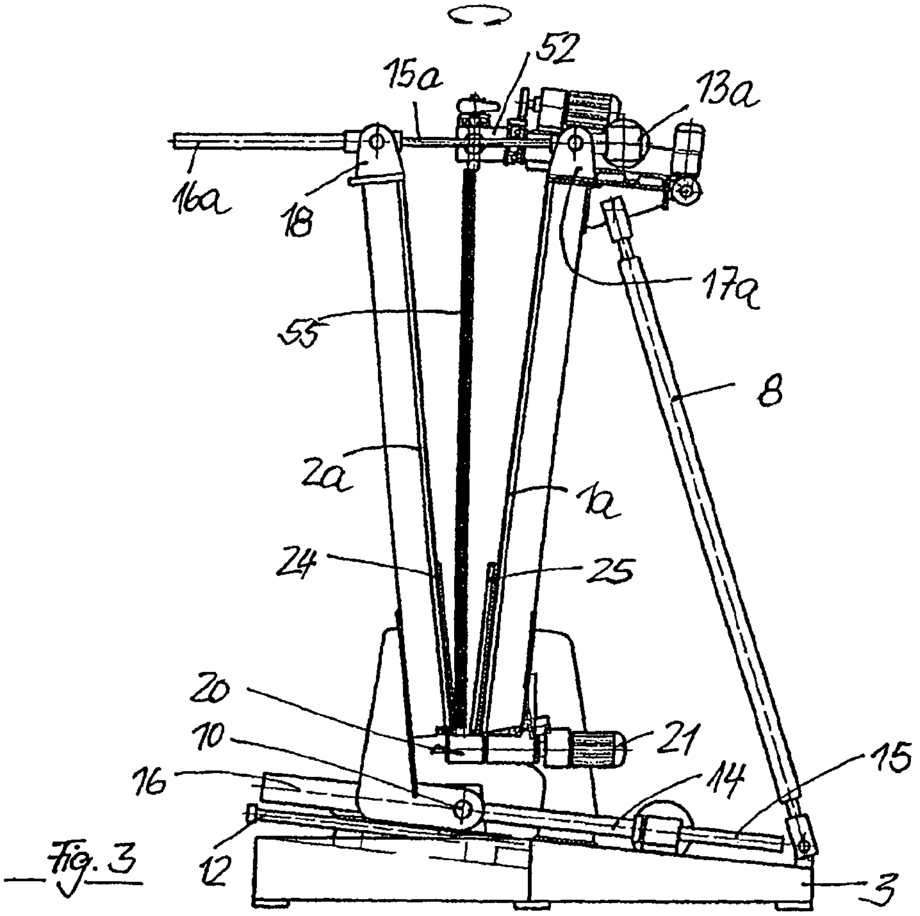
FIG. 3 shows a view similar to FIG. 1 of the same device, but with the sealing device turned by 90°.
Figure 4:
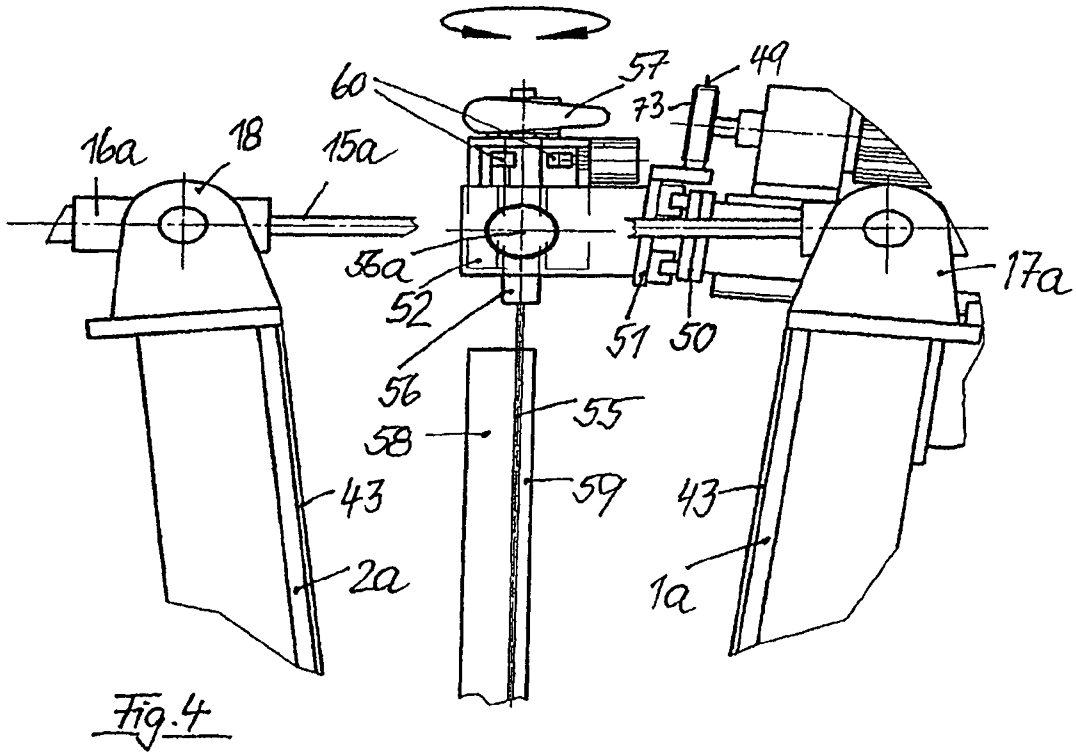
FIG. 4 shows an enlarged view of a detail from FIG. 3.

For fixing the axis 56 of the blade 55 in the positions illustrated in FIGS. 2 and 4, there are provided clamping jaws 60 that are capable of clamping between them the rotatable axis 56 of the blade 55. Preferably, one of the clamping jaws 60 is stationary while the other one can be operated by pneumatic means.

The spacing between the suspension 52 and the stationary pressure plate 1*a* is variable. For this purpose, either the guide rail 50 or the suspension 52 can be mechanically displaced relative to the guide rail 50 at a right angle to the pressure plate 1*a*, using servo motors that actuate a spindle.

The manner in which the blade 55 is suspended in the suspension 52 allows the blade to swing about its horizontal axis 56*a* as long as it is not blocked. In the position illustrated in FIG. 2, the axis 56*a* is blocked and the blade 55 hangs down vertically in the middle between the plates 1*a* and 2*a*. In its position illustrated in FIG. 4, the blade has been rotated by 90° about its vertical axis 56, and the horizontal axis 56*a* has been released. When the suspension 52 is pulled back (in FIGS. 4 and 6 to the right) whereby the blade 55 is approached to the stationary plate 1*a*, the blade 55 gets into contact with the plate first by its lower end and then progressively from the bottom to the top, pivoting simultaneously about its horizontal axis 56*a*, and will finally reach the position illustrated in FIG. 6.

The expanded plastic layers 58 and 59 project a certain length, for example by 10 mm, beyond the lower end of the sheet steel material of the blade 55. The blade 55 can be mechanically adjusted in upward and downward direction by a small length, for example by up to 30 cm. This permits the blade 55 to be lowered onto the belt 19 in sealing relationship. Lowering of the blade is supported by the inclination of the guide rail 50 which is shown in FIGS. 1 to 6 to be inclined at a right angle to the plane of the stationary pressure plate 1*a* and, thus, toward the upside of the horizontal conveyor 20. Increasing the inclination by 10%, for example, will suffice to place the lower end of the blade 55 on the belt of the horizontal conveyor 20, even without a separate motor effecting the horizontal adjustment.

Figure 9:
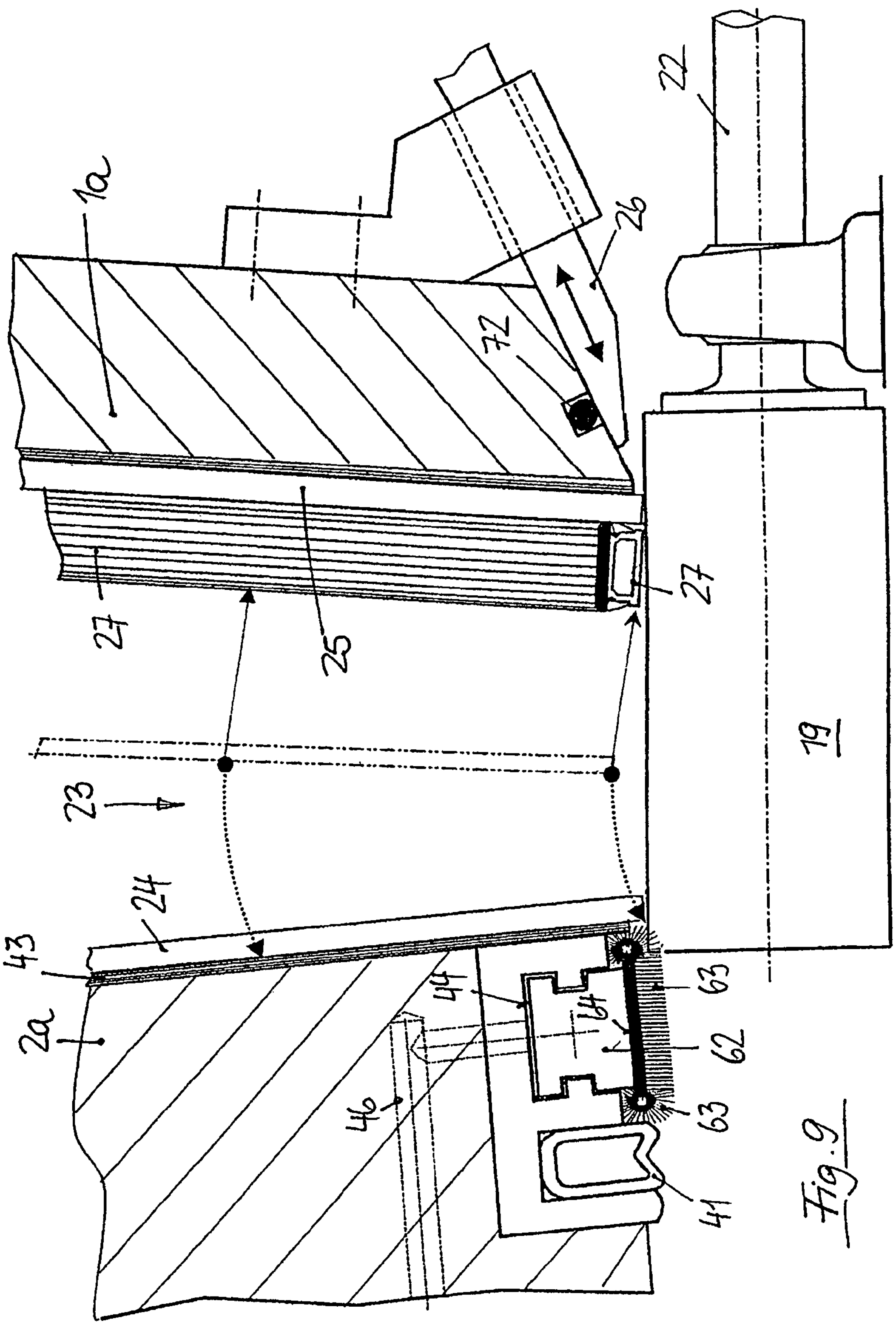
FIG. 9 shows a detail illustrating a vertical section through the device in the lower portion of the pressure plates, with the plates in the position illustrated in FIG. 1.
Figure 10:
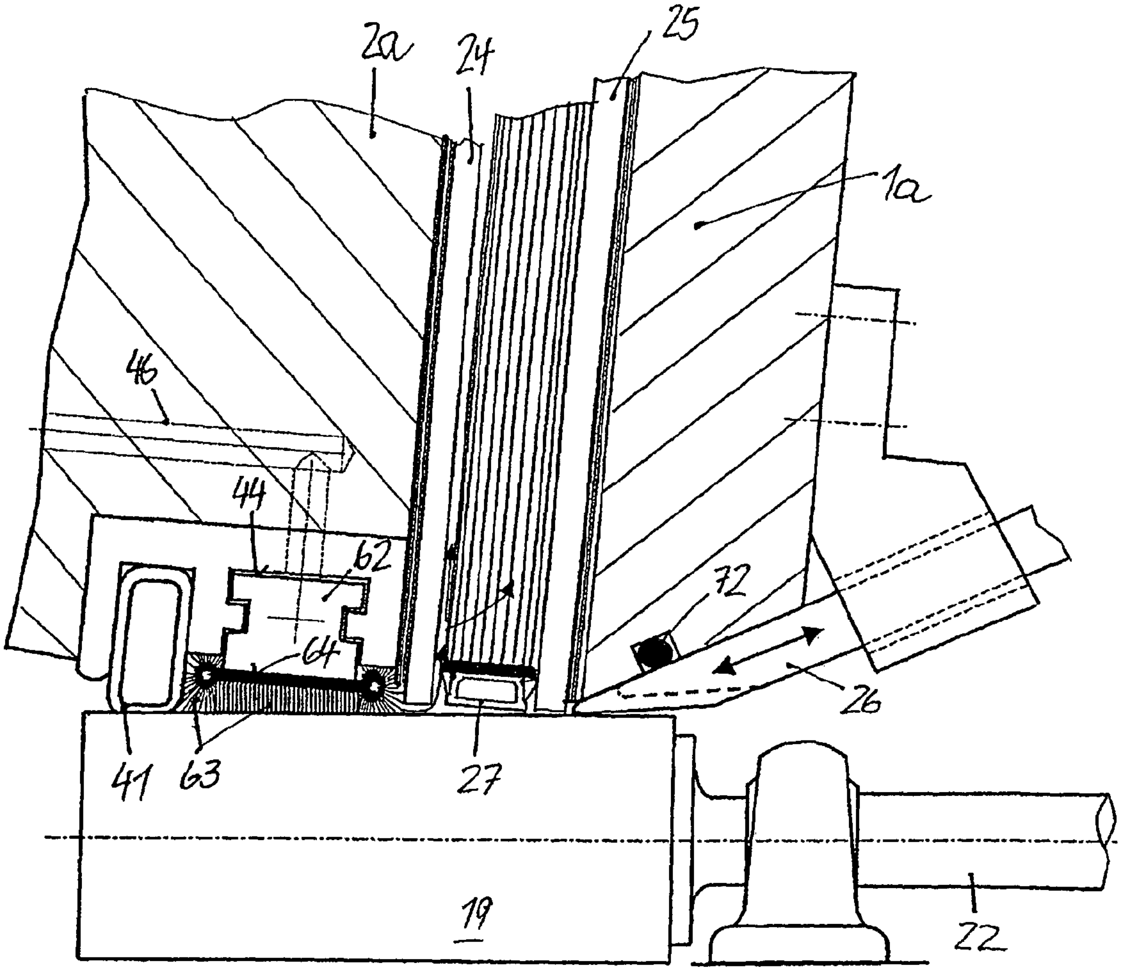
FIG. 10 shows a vertical section through the portion of the press illustrated in FIG. 9, but with the pressure plates in the position illustrated in FIGS. 7 and 8.

An oblong sealing body 62, provided on its bottom with a strip 64 that has its bottom surface tightly packed with bristles, can be displaced in the channel 44 by means of a driven endless rope or belt 61, especially a toothed belt. FIGS. 9 and 10 show a view in the conveying direction 4 of the end of the sealing body 62 and the strip 64 with the bristles 63. The sealing body 62 can be displaced in synchronism with the blade 55 and delimits the effective length of the channel 44 through which the gas different from air is supplied.

Figure 16:
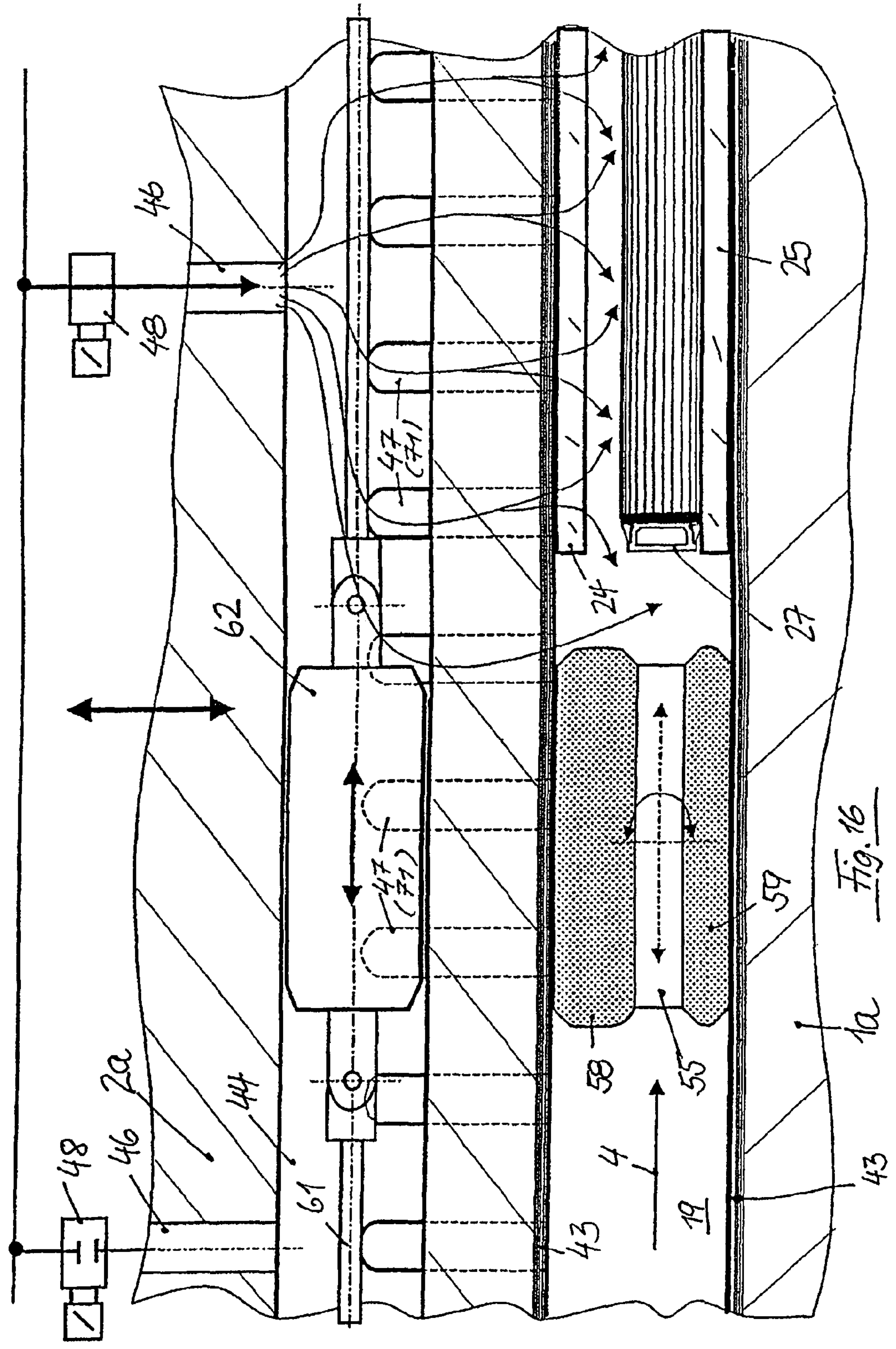
FIG. 16 shows a lengthwise section, taken at a right angle to the surface of the pressure plates, through a portion of the device, this section being valid for all the three embodiments and showing the pressure plates in a parallel position in which one insulating glass pane, or a plurality of them simultaneously, can be filled with a heavy gas.

As can be seen in FIG. 16, branch ducts 47 provided at regular spacings lead away from the channel 44 to the lower edge of the movable pressure plate 2*a*. The sealing body 62 is sized and arranged in such a way that at least two branch ducts 47 will be fully covered and blocked in any position—see FIG. 16. The bristles 63 act to seal the gap between the lower edge of the movable pressure plate 2*a* and the belt 19 to prevent any outflow of the gas different from air, against the conveying direction 4, in the position of the movable pressure plate 2*a* illustrated in FIG. 10.

The gas-filling press illustrated in FIGS. 1 to 10 and 17 to 20 operates as follows:

Pairs of glass panels that are to be assembled to an insulating glass pane are conveyed, preferably in synchronism, into and are positioned in the gas-filling press so that the forward edge of a first pair of glass panels 30 rests against the forward end of the pressure plates 1*a* and 2*a* and that further pairs of glass panels 31, 32 and 33 are positioned a small distance behind the first pair—see FIG. 19. Preferably, as many pairs of glass panels 30 to 33 as possible are placed in the gas-filling press. However, there is also the possibility, as indicated in FIG. 17, to utilize only part of the length of the gas-filling press. That solution may be selected in case the pairs of glass panels that follow each other are to be assembled to insulating glass panes of different thicknesses so that they cannot be pressed by a single operation.

In order to reduce the consumption of heavy gas as far as possible, the space between the pressure plates 1*a*, 2*a* into which heavy gas is to be introduced should be kept as small as possible. One therefore positions the blade 55 closely behind the last pair of glass panels, in the example illustrated in FIG. 17 behind the second pair of glass panels 31, in the example of FIG. 19 behind the fourth pair of glass panels 33. It is a particular advantage of the invention that the blade 55 may have been positioned before or may be positioned while the pairs of glass panels 30 to 33 are being conveyed into the gas-filling press. To this end, one selects the position of the blade 55 so that its axis 56 comes to lie approximately midway between the two pressure plates 1*a* and 2*a* and that the blade 55 is oriented at a right angle to the pressure plates 1*a* and 2*a* in which case the blade may swing a little, due to its poor elastic properties, in parallel to the conveying direction 4, but not crosswise to that direction, and that there is no risk that the blade 55 may get into contact with one of the glass panels 24, 25 or with the sticky spacer 27 or the adhesive coating of the spacer attached to one of the glass panels, namely to the glass panel 25 in the illustrated embodiment. Accordingly, the blade 55 may have assumed its position in which it is to seal the gas-filling press already before the pairs of glass panels 30 to 33 have been positioned. The sealing body is displaced in synchronism with the blade 55. Accordingly, it likewise has assumed its target position before the pairs of glass panels 30 to 33 have been positioned. This permits the shortest possible cycle times to be achieved for the gas-filling press.

Once the last pair of glass panels 31 (in FIG. 17) or 33 (in FIG. 19) has passed the blade 55, the clamping action of the clamping jaws 60 is released and the blade is pivoted about its axis 56 by 90°. As a result of that rotation, the thinner expanded plastic layer 58 will face the pressure plate 1*a* while the thicker expanded plastic layer 59 will face the movable pressure plate 2*a*. Then the suspension 52 is displaced to approach the blade 55 to the stationary pressure plate 1*a* at a right angle until the thinner expanded plastic layer 58 on the blade 55 has established contact with the pressure plate 1*a*, beginning at the lower edge of the pressure plate 1*a* and continuing to the upper edge of the pressure plate 1*a*. At the same time, the suspension 52 is lowered until the lower end of the blade 55 rests tightly on the belt 19. The movable pressure plate 2*a* simultaneously is pivoted to a position parallel to the stationary pressure plate 1*a*—illustrated by broken lines in FIG. 9—and is then approached to the stationary pressure plate 1*a* by parallel displacement until a gap of small width, for example of 2 mm, remains between the spacer 27 and the glass panel 24. At the same time, the sealing wedge 26 is advanced to its active position illustrated in FIG. 10, and the sealing strip 54 is moved to its active position in which it rests against the two forward vertical edges of the pressure plates 1*a* and 2*a*.

Once the movable pressure plate 2*a* has reached the desired position in which it keeps open only a small gap between the glass panel 24 and the spacer 27, as shown in FIG. 10, the hose 41 is blown up. This creates a chamber optimally adapted to the format of the enclosed pairs of glass panels 30 to 33, which is closed on five sides by the pressure plates 1*a* and 2*a*, by the glass panels 24 and 25 resting against them, by the sealing strip 54 at the forward edge of the pressure plates 1*a* and 2*a*, by the blade 55, by the sealing wedge 56, the hose 41, the sealing body 62 and the bristles 62, and which is open toward the top only. One now opens the electromagnetic valves 48 in the area between the sealing strip 54 and the sealing body 62 to allow heavy gas to flow into that chamber below the glass panel 24 and to rise to a level near the upper edge of the highest pair of glass panels without, however, allowing it to reach the upper edge. Once that level 53 is reached (see FIG. 17) the electromagnetic valves 48 are closed to terminate the supply of heavy gas, and the movable pressure plate 2*a* is further approached to the stationary pressure plate 1*a*. This typically raises the level of the heavy gas by further 15% to 20% so that it reaches or rises above the upper edge of the highest glass panels. The approaching movement of the pressure plates 1*a* and 2*a* closes and compresses the insulating glass pane. Thereafter, the hose 1 is evacuated in part, the gas-filling press is opened again, by at first removing the pressure plate 2*a* from the pressure plate 1*a* in a parallel movement and by then pivoting the movable pressure plate 2*a* to its initial position (FIG. 2) in which the two pressure plates are oriented in V form one to the other, the sealing wedge 26 is moved back to its inactive position, the sealing strip 54 is moved to its inactive position, the belt 19 is driven to discharge the assembled insulating glass panes from the gas-filling press, the blade 55 and its suspension are moved to the middle between the two pressure plates 1*a* and 2*a*, are rotated by 90°, are then clamped once more and may be displaced, together with the sealing body 62, to their next target position while the next pairs of glass panels are being fed into the gas-filling press.

The embodiment illustrated in FIGS. 11 to 14 differs from the embodiment illustrated in FIGS. 9 and 10 in that the sealing features provided at the lower edge of the movable pressure plate 2*a* have been changed. Now, sealing of the gap between the lower edge of the movable pressure plate 2*a* and the belt 19 is effected by a second sealing wedge 65 which, analogously to the sealing wedge 26, can be displaced along the beveled bottom of the pressure plate 2*a*. As the pressure plate 2*a* is pivoted and displaced, it entrains the second sealing wedge 65. In order to allow the sealing wedge to rest resiliently against the surface of the belt 19, a layer 66 of a resilient expanded plastic material is provided on the bottom of the sealing wedge, which has its bottom lined with a spring steel sheet 67. An extension 69 of the spring steel sheet 67 projects into a slot 70 of the sealing wedge 65, which is open toward the bottom, thereby producing a positive connection between the spring steel sheet 67 and the sealing wedge 65.

To conform with the beveled bottom of the movable pressure plate 2*a*, the sealing body 62 has been given a different profile with a correspondingly beveled bottom. The channel 44 in which the sealing body 62 can be displaced is open toward the bottom and ends in comb-like indents 71 in the sealing wedge. The indents 71 have the function of the branch ducts 47 in the first embodiment. The length of the sealing body 62 is selected so that it will block at least two indents of the sealing body 65 in any position.

The hose 41 has been omitted. Instead, as a possible alternative, there may be provided, for example between the sealing wedge 65 and the bottom of the movable pressure plate 2*a*, a longitudinally extending packing cord 72 of the kind provided similarly between the bottom of the stationary pressure plate 1*a* and the sealing wedge 26 arranged in that position.

Figure 11:
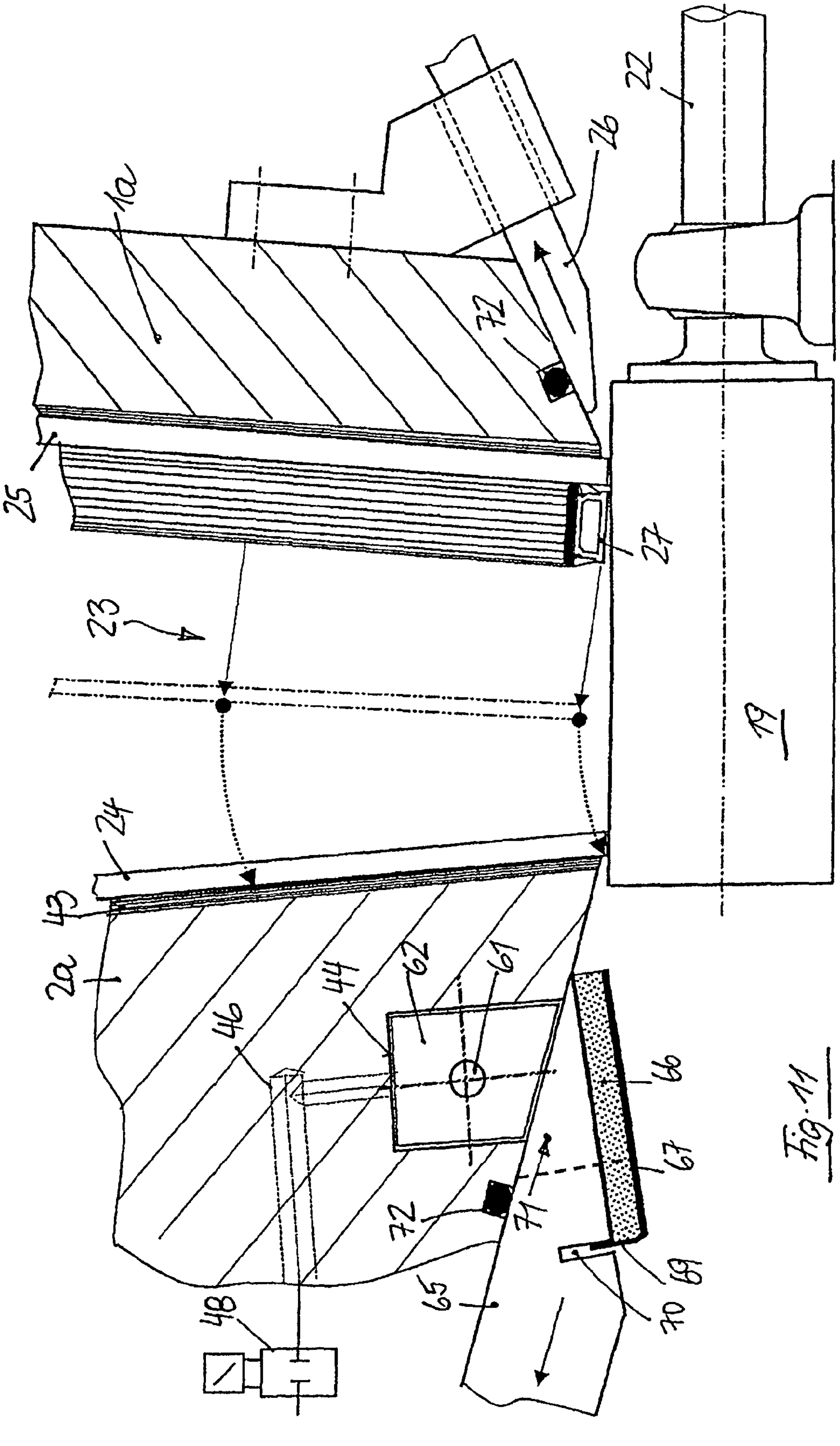
FIG. 11 shows a section similar to that of FIG. 9 through a second embodiment of the device.

FIG. 11 shows the gas-filling press in the initial position of the two pressure plates 1*a* and 2*a* in V form, after positioning of the glass panels 24 and 25. FIG. 2 shows the gas-filling press in the position in which the movable pressure plate 2*a* occupies a position parallel and opposite to the stationary pressure plate 1*a* and a small gap for the introduction of heavy gas is left between the spacer 27 of the insulating glass pane and the glass panel 24. The second sealing wedge 65 is in its active position, the expanded plastic layer 66 has been compressed to some degree. Conveniently, the sealing wedge 65 is pushed into the illustrated position only after the movable pressure plate 2*a* has reached its position illustrated in FIG. 12.

Figure 13:
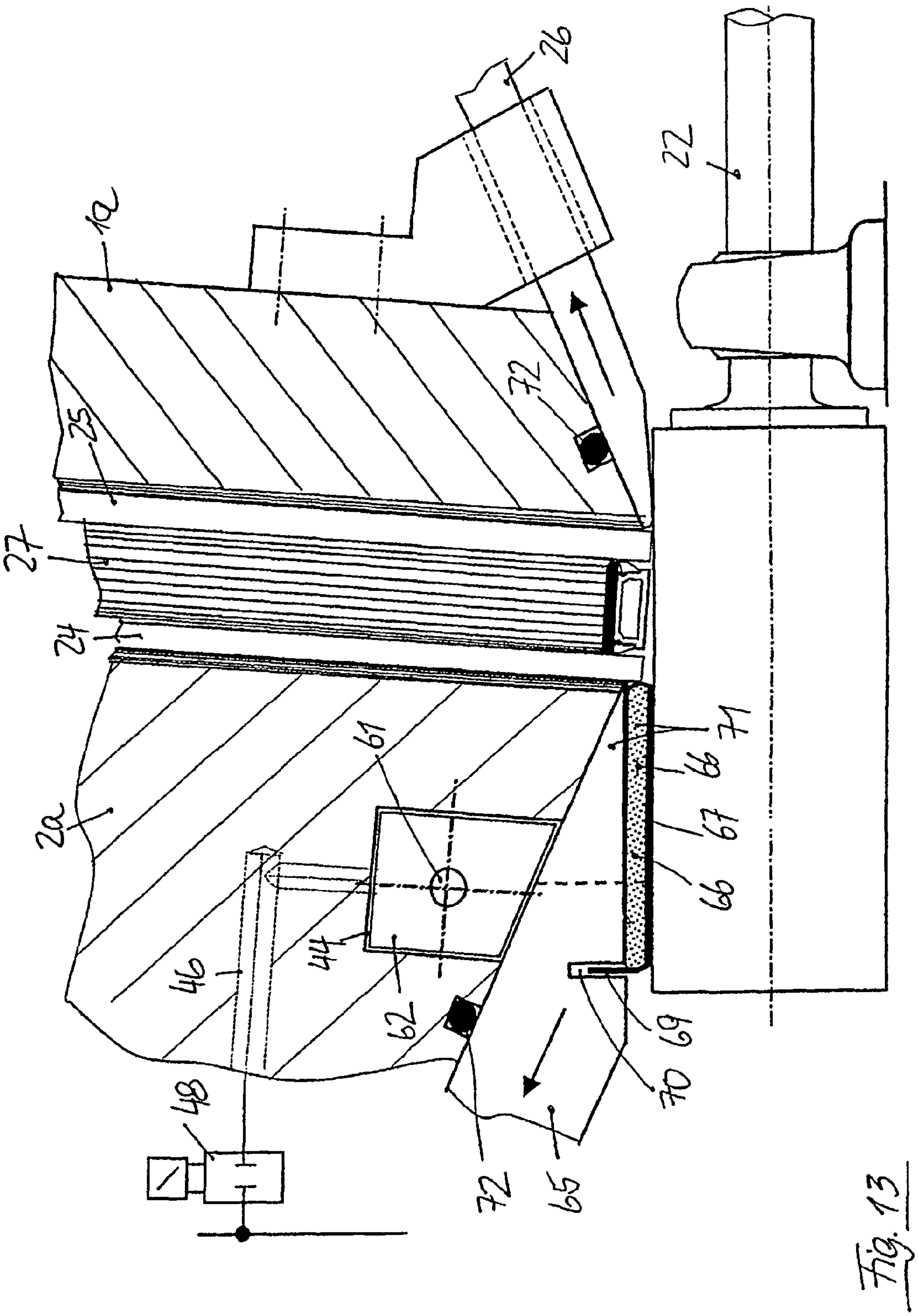
FIG. 13 shows a section through the device according to FIGS. 11 and 12, with the pressure plates in the position assumed by them during the pressing operation.
Figure 14:
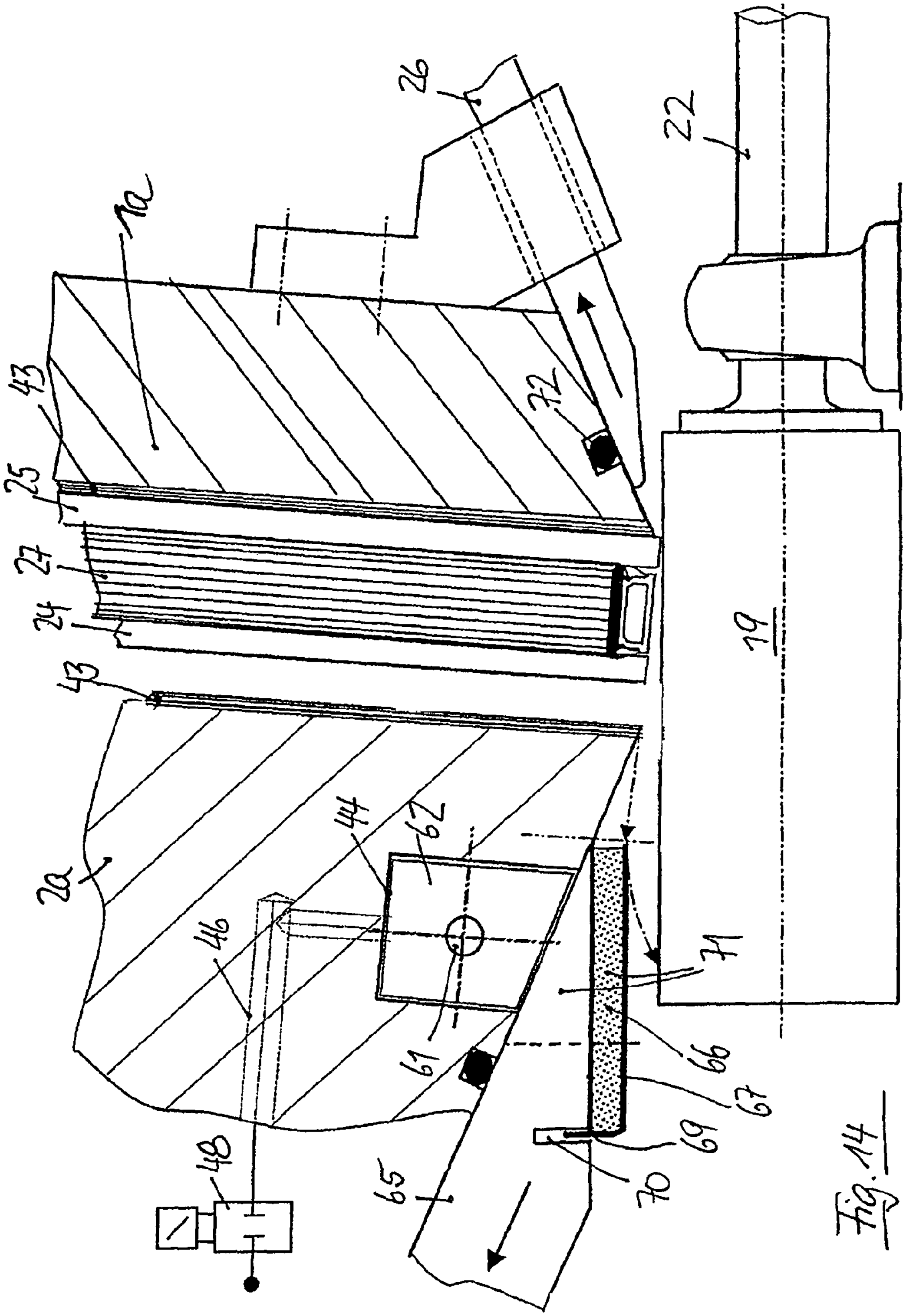
FIG. 14 shows a section through the second embodiment of the device, similar to that of FIGS. 11 to 13, with the pressure plates in the position assumed by them during opening of the press.

FIG. 13 shows the gas-filling press in the pressing position which is reached by the movable pressure plate 2*a* as it is further approached to the stationary pressure plate 1*a*. The expanded plastic layer 66 is further compressed by that process. Following the pressing operation, the second sealing wedge 65 is withdrawn to its inactive position and the movable pressure plate 2*a* is at first moved in parallel to itself, away from the stationary pressure plate 1*a*, to the position illustrated in FIG. 14, and is then returned by a pivoting movement to the position illustrated in FIG. 11.

Figure 12:
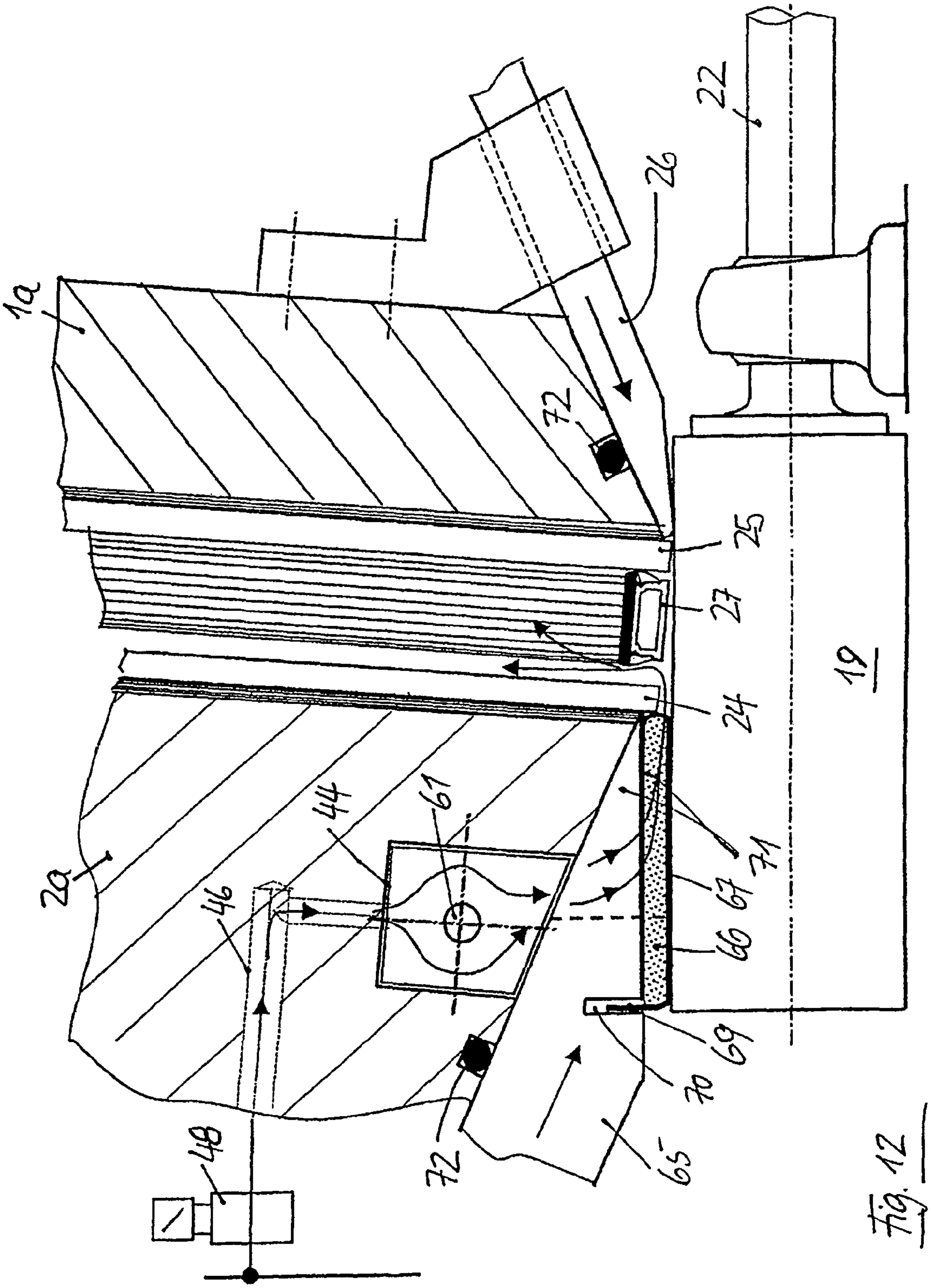
FIG. 12 shows a section similar to that of FIG. 10 through the second embodiment of the device.

In the example illustrated in FIGS. 12 and 13 the expanded plastic layer 66 is bordered by a spring steel sheet 67 bent to U shape so that the sheet covers both the bottom and the top of the expanded plastic layer 66. A rounded forward edge of the spring steel sheet 67 facilitates the movement of the second sealing wedge 65 to its sealing position (FIG. 12), compared with the embodiment illustrated in FIGS. 11 and 14.

Figure 15:
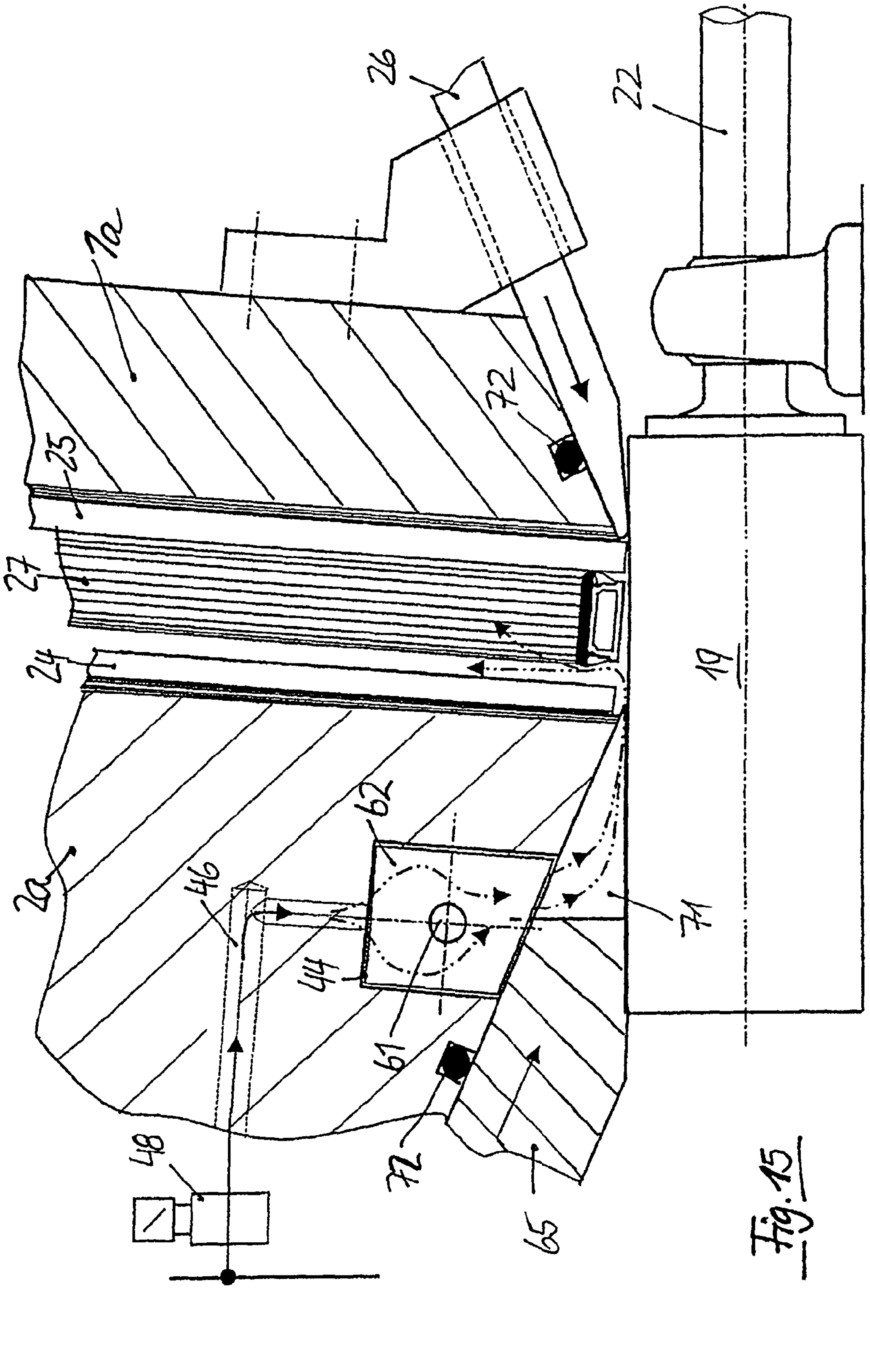
FIG. 15 shows a section through a third embodiment of the device similar to that of FIG. 12.

The embodiment illustrated in FIG. 15 differs from that shown in FIG. 12 in that the second sealing wedge 65 does not have a resilient expanded plastic strip on its bottom. Sealing is possible also with that simplified form of the sealing wedge 65. However, it would be recommendable in that case to leave the sealing wedge in its position illustrated in FIG. 15 as the movable pressure plate 2*a* is moved closer to the stationary pressure plate 1*a* for closing and pressing the insulating glass pane.

Figure 18:
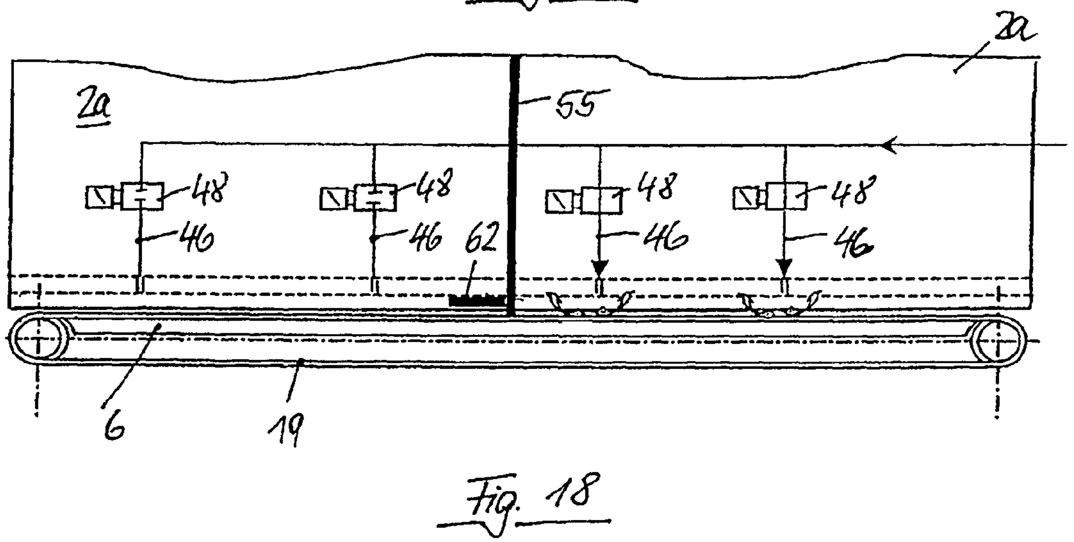
FIG. 18 shows a view that illustrates diagrammatically the way in which the heavy gas is supplied into the device when the suspended sealing device occupies the position illustrated in FIG. 17.

Given the fact that instead of being placed on the belt 40*a* in vertical arrangement, the glass panels are inclined in the assembly and pressing device so that they act on the belt 40*a* only by one of their lower edges, they will not slip during the feeding motion so that their exact alignment one to the other will not get lost. Further, it is a favorable aspect that has not been known in the art before, that they can be filled with heavy gas from below over their full length without any need to provide a pervious belt which is drawn over the gas-filling channel, or to provide two belts in the horizontal conveyor running in parallel and at a spacing one to the other, through which heavy gas could be introduced into the space between the glass panels. Instead, it is possible according to the invention to use a conveying element consisting of a uniform, absolutely tight belt 40*a* because the heavy gas can be introduced without any problem from the side of the movable pressure plate 2*a* through a gap between the belt 40*a* and one of the glass panels 24. This permits a much simpler structure of the assembly and pressing device with gas-filling system than has been possible before, and the possibility to simultaneously fill two or more than two insulating glass panes with heavy gas further allows short cycle times and a less expensive insulating glass production to be achieved, compared with the prior art, and this especially when producing insulating glass panes of common standard dimensions. On the other hand, the invention can be employed with great versatility allowing the production not only of rectangular insulating glass panels, but also of what is known as model panes, with a contour different from a rectangular shape. Examples of such applications are shown in FIGS. 7 to 10 and 15 to 17. Moreover, three-pane insulating glass panes can be produced as well. In this case, one initially assembles two glass panels filled with gas—as has been described before—and then feeds the third glass panes, that have been positioned in a row in the buffer station before, into the assembly and pressing device, fills them with gas and assembles them with the previously assembled first and second glass panes, as illustrated in FIG. 18.

Further, large format insulating glass panes of a size that permits only a single one of such panels to be placed in the assembly and pressing device, can produced in the same way as in a conventional production line for insulating glass panes. In this case, the process may include the steps of transporting the two glass panels leaning against the immovable supporting devices, one after the other through the pairing station and through the buffer station and into the assembly and pressing device, and of arranging them in opposite pairs only at that point by causing the movable pressure plate 2*a* to attract by suction the glass panel arriving the first and to thereby take over the panel and make room for delivery of the second glass panel that carries the spacer.

In all these cases, the heavy gas is permitted to rise between parallel glass panels in a constant upward flow, without greater turbulences, and to displace the lighter air to the top without getting mixed with it.

Finally, it is also possible to assemble insulating glass panes without filling them with a heavy gas.

List of Reference Numerals

1. Supporting device
1*a*. Plate
2. Supporting device
2*a*. Plate
3. Frame
4. Conveying direction
5.
6. Rail
7. Base
8. Struts
9. Horizontal line
10. Axis
11. Carriage
12. Rails
13. Motor
13*a*. Motor
14. Spindle drive
14*a*. Spindle drive
15. Spindle
15*a*. Spindle
16. Housing
16*a*. Housing
17. Holder
17*a*. Holder
18. Holder
19. Belt
20. Horizontal conveyor
21. Motor
22. Axes
23. Gap
24. Glass panel
25. Glass panel
26. Sealing wedge
27. Spacer
30. First pair of glass panels
31. Second pair of glass panels
32. Third pair of glass panels
33. Fourth pair of glass panels
41. Hose
43. Rubber layer
44. Channel
45. Partition walls
46. Supply line
47. Branch duct
48. Electromagnetic valves
49. Belt
50. Guide rail
51. Carriage
52. Suspension
53. Level
54. Sealing strip
55. Blade
56. 56*a* Axes of 55
57. Rotary drive
58. Expanded plastic layer
59. Expanded plastic layer
60. Clamping jaws
61. Belt
62. Sealing body
63. Bristles
64. Strip
65. Second sealing wedge
66. Expanded plastic layer
67. Spring steel sheet
68.
69. Extension
70. Slot
71. Comb-like indents
72. Packing cord
73. Guide rollers

The invention claimed is:

1. A device for assembling insulating glass panes filled with a gas different from air, said device comprising:

two pressure plates moveable between a V orientation with one another and a parallel orientation with one another, the parallel orientation being inclined toward a horizontal reference;

a horizontal conveyer belt disposed proximate lower edges of the plates;

at least two seals extending from an upper rim of the belt to a point above the belt, the two seals being spaced apart from one another in a conveying in direction of the belt, at least one of the seals being active between the two plates, at least one of said two pressure plates being provided with holes therethrough for enabling air, driven through said holes, to retain a selected glass panel against said at least one of the plates;

a supply line and channel for introducing a gas different from air into a space between the two plates from below;

the active seal being designed as a suspended blade with a suspension located above the space between the two pressure plates and displaceable along an upper edge of a first of the two pressure plates and variable with respect to spacing from a plane that includes a front of the first pressure plate in order that arrangements of glass panels for insulating panes can be conveyed without any obstruction past the blade positioned between the pressure plates, the blade being provided with a reversably yielding sealing material on at least a one side of the blade, the sealing material extending over a full length of the blade.

2. A device for assembling insulating glass panes filled with a gas different from air, said device comprising:

two pressure plates moveable between a V orientation with one another and a parallel orientation with one another, the parallel orientation being inclined toward a horizontal reference;

a horizontal conveyer belt disposed proximate lower edges of the plates;

at least two seals extending from an upper rim of the belt to a point above the belt, the two seals being spaced apart from one another in a conveying direction of the belt, at least one of the seals being active between the two plates, at least one of said two pressure plates being provided with holes therethrough for enabling air, driven through said holes, to retain a selected glass panel against said at least one of the plates;

a supply line and channel for introducing a gas different from air into a space between the two pressure plates from below;

the active seal being designed as a suspended blade with a suspension located above the space between the two pressure plates and displaceable along an upper edge of a first of the two pressure plates and variable with respect to spacing from a plane that includes a front of the first pressure plate in order that arrangements of glass panels for insulating panes can be conveyed without any obstruction past the blade positioned between the pressure plates, the blade being provided with a reversably yielding sealing material at least a one side of the blade.

3. The device as defined in claim 2, wherein the blade is provided with the sealing material on both sides.

4. The device as defined in claim 2, wherein the sealing material extends a certain length beyond a lower end of the blade.

5. The device as defined in claim 2, wherein the sealing material is provided on the blade in equal width from a bottom to a top.

6. The device as defined in claim 2, wherein the sealing material is provided in a thicker layer on the one side of the blade, compared with a thickness of a layer on the opposite side of the blade.

7. The device as defined in claim 2, wherein the arrangement of one of the two plates is stationary.

8. The device as defined in claim 7, wherein the suspension of the blade is mounted on the stationary plate.

9. The device as defined in claim 6, wherein the thinner layer of the sealing material faces the stationary plate.

10. The device as defined in claim 2, wherein the blade becomes wider from a bottom to a top.

11. The device as defined in claim 10, wherein the blade widens in wedge form from the bottom to the top.

12. The device as defined in claim 11, wherein a wedge angle defining the increase in width of the blade from the bottom to the top conforms to the angle enclosed between the two plates in their initial position in V form in which they are spaced the greatest distance one from the other.

13. The device as defined in claim 2, wherein the suspension of the blade is adjustable in height.

14. The device as defined in claim 13, wherein the blade can be adjusted in height so that the blade, or only the sealing material provided on the blade, extends down to the belt when the blade rests tightly against the first plate, and that the blade or the sealing material is spaced from the belt when the blade is not in contact with the first plate.

15. The device as defined in claim 13, wherein the suspension can be displaced in a plane, that intersects the conveying direction at a right angle, in a direction inclined against the flat upside of the belt so that the blade will be lowered as it approaches the first plate.

16. The device as defined in claim 2, wherein the blade is pivotable about an axis extending from a top to a bottom, and about the center axis of the blade.

17. The device as defined in claim 16, wherein the blade is pivotable by 90° about its axis extending from the bottom to the top.

18. The device as defined in claim 16, wherein the axis that extends from the bottom to the top can be blocked.

19. The device as defined in claim 2, wherein the blade is suspended to swing about a horizontal axis that extends in parallel to the conveying direction.

20. The device as defined in claim 19, wherein the axis about which the blade is permitted to swing can be blocked.

21. The device as defined in claim 2, wherein at least one of the plates, on which a means for retaining a glass panel is provided, and the belt can be adjusted one relative to the other in a manner such that the spacing of the lower edge of the plate from the belt can be increased, and that the supply line and channel for supplying the gas different from air are associated to a lower edge of the plate.

22. A device for assembling insulating glass panes filled with a gas different from air, said device comprising:

two pressure plates moveable between a V orientation with one another and a parallel orientation with one another, the parallel orientation being inclined toward a horizontal reference;

a horizontal conveyer belt disposed proximate lower edges of the plates;

at least two seals extending from an upper rim of the belt to a point above the belt, the two seals being spaced apart from one another in a conveying direction of the belt, at least one of the seals being active between the two plates, at least one of said two pressure plates being provided with holes therethrough for enabling air, driven through said holes, to retain a selected glass panel against said at least one of the plates;

a supply line and channel for introducing a gas different from air into a space between the two pressure plates from below;

the channel, being associated to the lower edge of the plate on which a glass panel can be retained at a spacing from the belt, and that the channel extends in parallel to a conveying direction and that branch ducts extend from that channel and open into a gap between the belt and the lower edge of the glass panel retained on the plate;

the active seal being designed as a suspended blade with a suspension located above the space between the two pressure plates and displaceable along an upper edge of a first of the two pressure plates and variable with respect to spacing from a plane that includes a front of the first pressure plate in order that arrangements of glass panels for insulating panes can be conveyed without any obstruction past the blade positioned between the pressure plates, the blade being provided with a reversably yielding sealing material at least a one side of the blade.

23. The device as defined in claim 22, wherein a sealing body is provided in the channel for lengthwise displacement, for changing the effective length of the channel.

24. The device as defined in claim 23, wherein the sealing body can be displaced in synchronism with the blade.

25. The device as defined in claim 23, wherein the sealing body is longer than the spacing between two branch ducts.

26. The device as defined in claim 23, wherein the channel can be supplied with the gas different from air through a plurality of supply lines that can be shut off individually.

* * * * *